United States Patent [19]
Wiesauer et al.

[11] Patent Number: 6,106,471
[45] Date of Patent: Aug. 22, 2000

[54] PROCEDURE FOR AN EXAMINATION OF OBJECTS BY THE MEANS OF ULTRASOUND WAVES

[75] Inventors: Franz Wiesauer; Erwin Fosodeder; Artur Gritzky, all of Zipf, Austria

[73] Assignee: Kretztechnik Aktiengesellschaft, Zipf, Austria

[21] Appl. No.: 09/324,478

[22] Filed: Jun. 2, 1999

[30] Foreign Application Priority Data

Jun. 4, 1998 [EP] European Pat. Off. ............ 98 890 169

[51] Int. Cl.[7] ..................................................... A61B 8/00
[52] U.S. Cl. .......................................................... 600/443
[58] Field of Search ........................... 680/455; 600/443, 600/447, 458, 459; 128/916

[56] References Cited

U.S. PATENT DOCUMENTS 5,704,361  1/1998  Seward et al. ........................... 600/459
5,787,889  8/1998  Edwards et al. ......................... 128/916

*Primary Examiner*—Marvin M. Lateef
*Assistant Examiner*—Maulin Patel
*Attorney, Agent, or Firm*—Collard & Roe, P.C.

[57] ABSTRACT

The invention describes a procedure for the examination of objects by the means of ultrasound waves whereby a volume-of-interest is scanned by a 3D-ultrasound-probe by moving a transmitter/receiver beam in a scan plane within selectable limits. This B-mode scan plane is also simultaneously moved in a direction across to this scan plane. The transmitting of sound pulses and acquiring the echo-signals is done more or less continuously during the movement in B-plane and across to it The echo-signals are stored in a volume memory on addresses which correspond to the spatial position of the echo-generating structure inside the object. These stored data-sets are evaluated by a 3D-processor and are represented on at least one display unit by different algorithms with selectable parameters. Important is that the acquisition and the representation is done continuously.

6 Claims, 5 Drawing Sheets

PROCEDURE FOR AN EXAMINATION OF OBJECTS BY THE MEANS OF ULTRASOUND WAVES

FIELD OF THE INVENTION

This invention relates to a procedure for an examination of objects by the means of ultrasound waves whereby a volume-of-interest is scanned by a 3D-ultrasound-probe, whereby a scan plane for the acquisition of echo data is moved into a transverse direction referred to the scan plane.

DESCRIPTION OF THE PRIOR ART

The scanning of a spatial area of an object which should be examined and the storage of the scanned data in a geometrically correct way is well known (see e.g. AT 358 155 B). With this method a scanning plane (B- or C-Plane) is moved over the object of interest. This scanning movement is done either manually (with a simultaneous measurement of the position of the scan-plane in relation to a reference position) or by a special probe which moves the sensor automatically (see e.g. AT 1708 GM).

The volume-scanning has a lot of essential benefits compared to the standard method of scanning only one single plane (B- or C-mode). As an example: with the volume-scanning-method it is possible to reconstruct and visualize the echo-information in an arbitrary plane through the scanned object whereby this visualization plane does not depend on the position and direction of the planes which were used to scan the object. That means that images of the object (e.g. human body) can be visualized which are not obtainable by standard scanning (e.g. due to anatomical reasons). Furthermore by using specific algorithms for visualization it is possible to represent the echo-information generated by a reflecting surface inside the scanned object in a way that the observer gets an 3-dimensional (3D) impression of the object which is defined by that surface. With this method the observer can virtually walk around the object and see the corresponding view of the object on the display because the viewing angle is independent from the direction from which the object is scanned. The known methods using volume-scanning are only capable to make one volume-scan and then reconstruct and visualize the data-set. The reason is that for continuous volume-scanning a special probe is needed for automatic scan-movement, a special 3D data storage and a high-speed 3D data processor. Almost all known methods fulfill only one or two of these requirements. And in addition some methods are needed which are part of this invention.

With the known volume-scan-method and their associated reconstruction technology the observer can move around the object to visualize the different viewing angles but the scanned data of the object are static. If e.g. the scanned object is a fetus then the observer can look to the fetus from different angles but he cannot visualize a movement of the fetus itself because the 3D dataset is "frozen".

A critical issue for the visualization is the removal of echoes which are in front of the surface of interest and which interfere therefor the view to the surface. A typical scenario in Obstetrics is the abdominal scan of a fetus. It is obvious that between the ultrasound probe and the fetal face the echoes reflected by the maternal tissue is displayed which hide the view to the fetal face. The volume-scanning-method defines a volume of interest and only data which are inside this area are evaluated. But as mentioned above, the object is not scanned in a continuous way.

SUMMARY OF THE INVENTION

The invention has been made to allow to scan continuously an object with a volume rate which is high enough to follow its movement (e.g. fetal face) and to visualize it simultaneous on a display. The visualization algorithms comprise methods which result in a 3D impression for the observer as well as methods to reconstruct the echo-information in an arbitrary plane through the scanned object. Also the combination of both in one representation of the volume data is intended. Particularly a high rate of scanned volume per time should be insured by measures like limitation of the scanned volume according to the volume-of-interest for the reconstruction. One aspect of the invention is also to avoid artifacts generated during scanning or during reconstruction. These requirements are fulfilled by the invention in that the received echo signals are sampled and stored on an address which corresponds to the correct position of the echo-generating structure inside the object and these signals are used for volume representation on at least one display unit by selectable parameters comprising a 3D ultrasound probe which scans within selectable limits a B-mode scan plane and which moves this scan plane across to the plane also within selectable limits whereby the transmitting of sound pulses and acquiring the echo-signals is done more or less continuously during the movement in B-plane and across to it and whereby these signals are stored in the volume memory and evaluated by a 3D-processor for a 3D representation of the data sets on the display unit.

The method is applicable with ultrasound probes in which the sensor (transducer) is moved in the scan-plane mechanically as well as with probes in which a multi-element transducer performs the scanning in this plane by electronic means. It is essential to scan only the volume of interest to achieve high scan-rates in the continuous scanning. In the same way it is essential to avoid interruptions of data acquisition between two adjacent scan-planes.

To avoid artifacts or not to reduce the scan rate in the latter case, the transmitter/receiver unit is reciprocatingly moved in a forward and return movement across the volume, the signals during the return movement being generated at least close to the scanning traces during the forward movement. According to this invention the scanning ultrasound beam moves in two directions simultaneously: one is a fast movement (M-B) in the scan plane; the second one is the slower movement (M-3D) of the scan plane over the object. The directions of both movements are more or less perpendicular one to each other; but not necessarily. Therefor the trace of the scan plane is no longer perpendicular to the direction of M3D but has an certain angle (even if the M-B and M-3D directions are perpendicular) because during the time interval need to scan the B-plane the transducer was also moved in M-3D direction. The length and the angle of these traces depend on the scan-conditions (especially on the size of the scanned volume). If the transducer is moved mechanically within the scan-plane then the trace of the scan-planes is saw-tooth-shaped. If a multielement transducer is used for the scan-plane then the image-acquisition can always start from the same side. To fulfill all the intended requirements mentioned, the series of echo pulses during the forward movement is reversed during the return movement whereby the B-mode image has the same spatial position during the return movement as during the forward movement. The storage of the echo-signals reflected from the scanned volume is preferably done in a vector-oriented volume memory.

Furthermore the optimization of the size of the scanned volume respectively the selection of the volume-of-interest can be done by selectively matching the method to the object by a parameter selected from the group consisting of adjusting the scanning angle of the B-mode image, the swivelling angle for the volume scanning, the number of echo pulses forming the B-mode image, the sweeping speed of the canning, the maximum depth of the echo pulses, and the arbitrary plane from which the volume is illuminated.

If the probe is not moved by the user then the content of the volume memory is similar between two adjacent scans; the difference is only caused by the movement of the object itself. To get a smooth representation of the movement of the object there is an interpolation on the display unit between at least two sequentially produced images.

BRIEF DESCRIPTION OF THE DRAWING

More details and benefits of the present invention will be apparent when the following description of the preferred embodiments are considered taken in conjunction with the accompanying drawings.

DESCRIPTION OF THE PREFERRED EMBODIMENT

Figure 1:
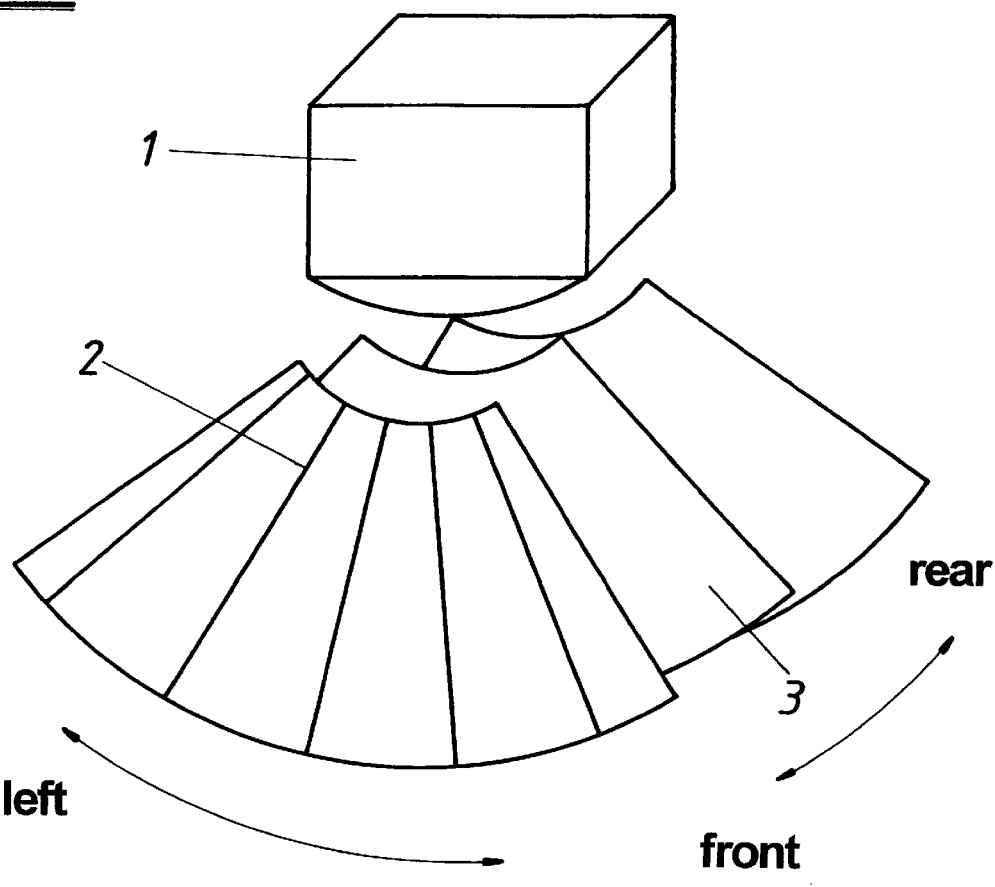
FIG. 1 Schematics of an ultrasound probe

FIG. 1 shows schematically an ultrasound probe 1 which generates a scan plane 3 by individual scan lines 2 whereby the scan plane is moved over the object producing a series of B-mode images representing the scanned volume. It is assumed without any restriction of the general case that the ultrasound beam is moved from left to right and the volume scan is directed from the front to the rear.

Figure 2:
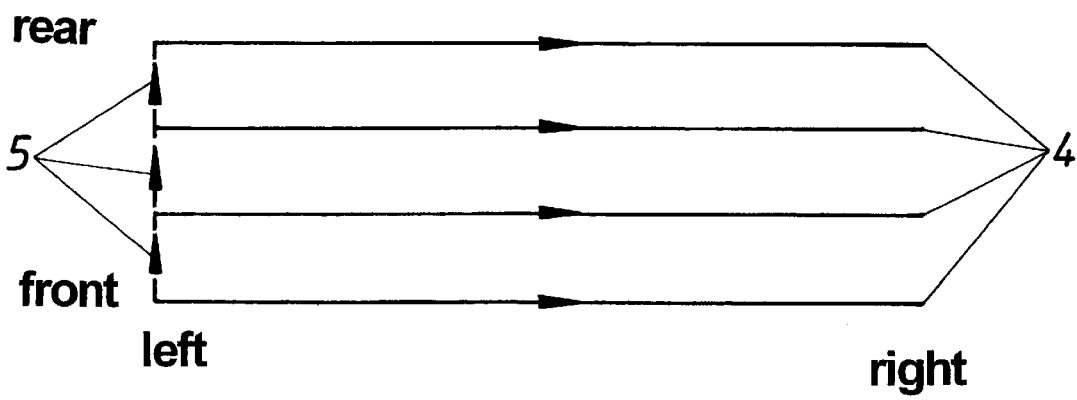
FIG. 2 traces of the scan planes in one possible realization
Figure 3:
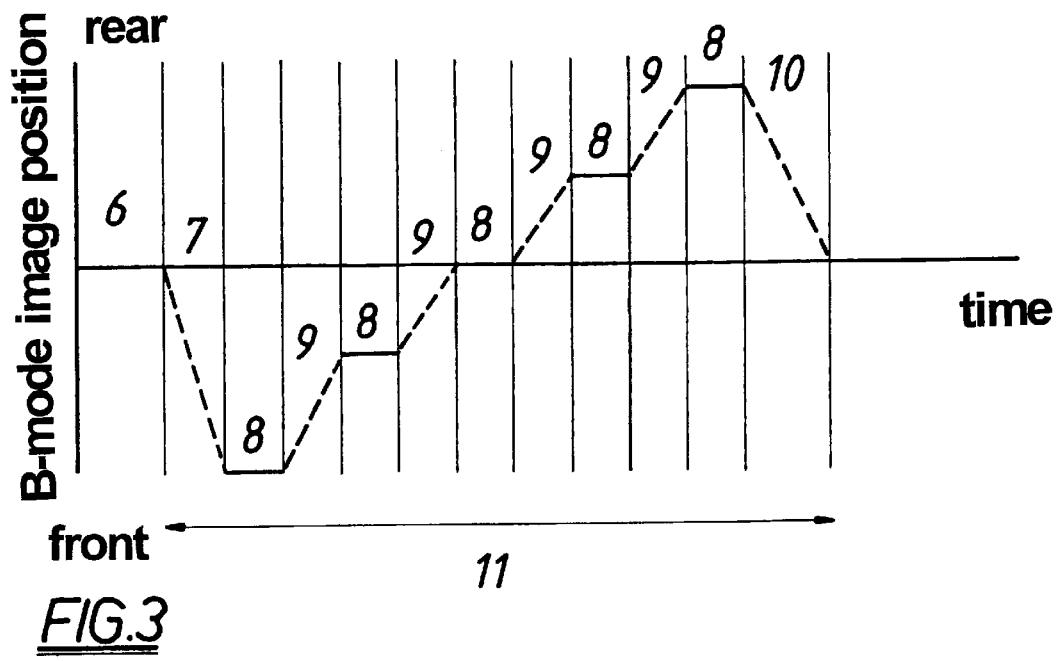
FIG. 3 diagram illustrating the scan-periods and positioning-periods according to standard 3D scanning methods versus time FIG. 4 diagram corresponding to FIG. 3 but following the procedure according to the present invention FIG. 5 traces of the scan planes if the B-Mode-scanning (M-B) is done in both directions of the 3D-scanning (M-3D)

To illustrate the idea of the invention a 3D scan procedure (FIG. 1) is analyzed according to a standard method using a special 3D probe. FIG. 2 shows the traces of the scan plane 4 on a plane which is orthogonal to the central ultrasound beam of the central scan plane. The traces of the scan planes are oriented parallel one to each other and orthogonal to the projection of the movement of the scan planes 5. It is assumed that the sound beam can be repositioned from the end of a B-mode scan to the begin of the next without any delay. This condition is fulfilled if a multielement (electronic) probe is used for the B-mode scan. The preferred solution intends such a probe. If we look to the scan-procedure as a function of the B-mode image position versus time (FIG. 3). At the start of the scan procedure the scan plane is located in the central position in reference to the 3D probe. After the start of the scan procedure the scan plane is moved to position 7 ("in front"), at this position a B-mode image is acquired (8), then the scan plane is moved to the next position (9), B-mode image acquisition (8) etc. At the end of the scan procedure (position "at the rear") the scan plane is moved again into the start position 6 (10). That means the procedure 11 takes significantly more time (for the sum of the periods 6, 7, 9, 10) than the sum of time periods 8 which are necessary for the data-acquisition itself.

Figure 4:
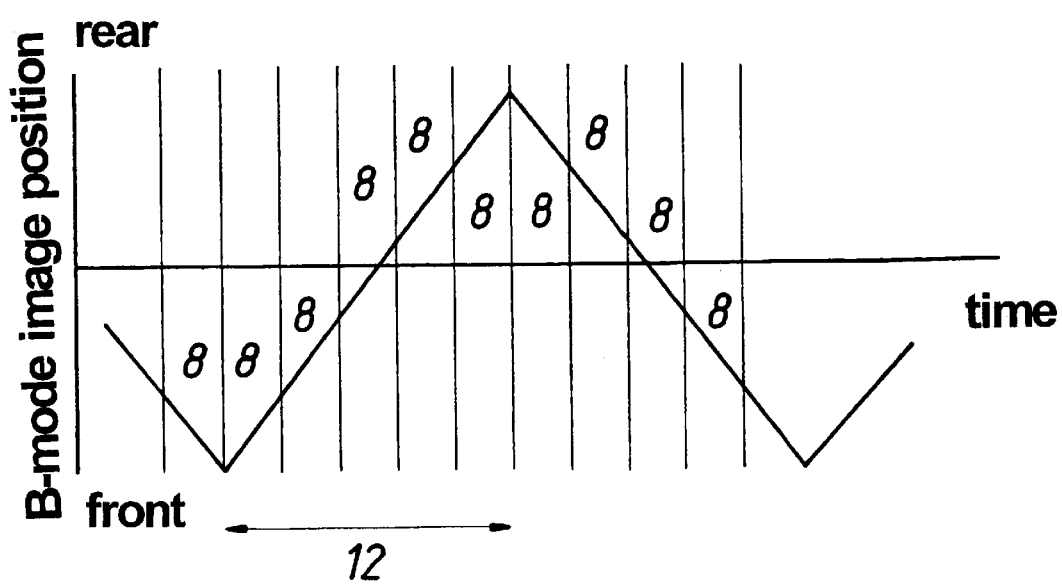

According to the present invention the volume is scanned continuously whereby both scan-movements (M-B and M-3D) are done simultaneously. This situation is illustrated in FIG. 4 with the same time-scale as the illustration of FIG. 3 which represents the same scanning procedure but according to the state-of-the-art. It is important that the data acquisition and storage is done during the movement from the front to the rear as well as during the movement in the opposite direction from the rear to the front. It is obvious that the scan period 12 is significantly shorter than the scan period in FIG. 3.

Figure 5:
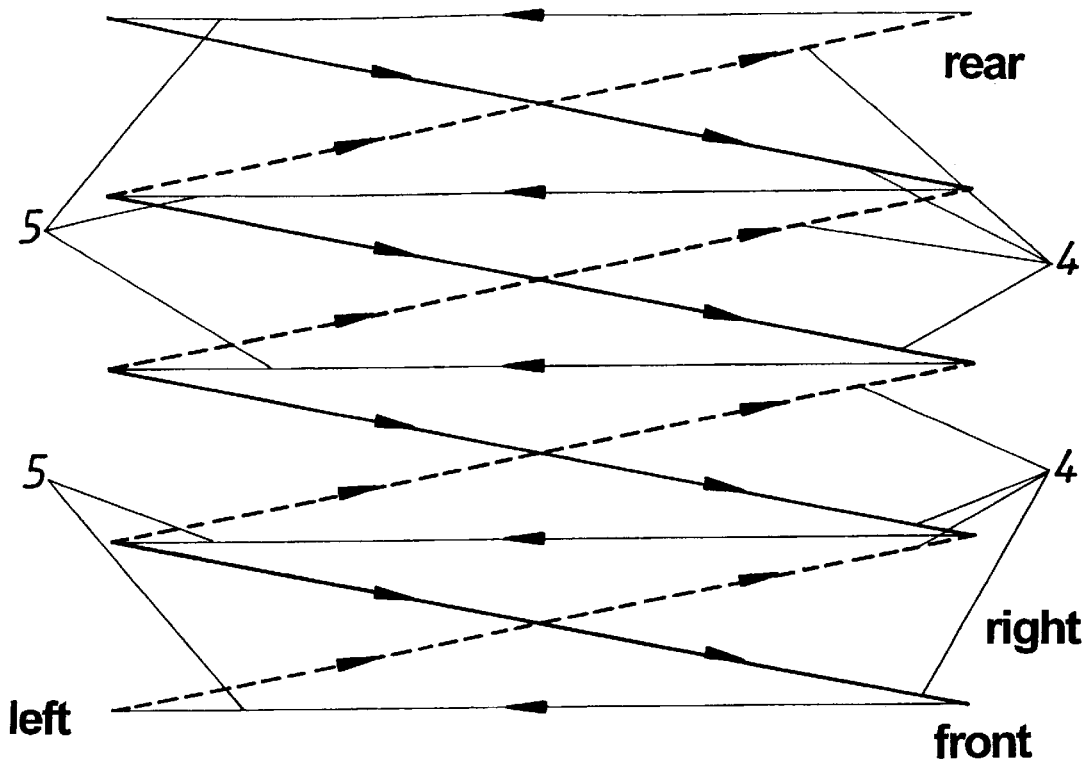

If the traces of the scan planes are considered (FIG. 5) then we can see that the traces are not longer orthogonal to the direction of the volume scan movement (M-3D) but have an oblique angle. The reason is that during the scan of one B-mode image the scan plane itself is also moved. The straight line is a first approximation of the actual shape of the trace which depends on the selected scan conditions. For a better clearness the traces of the scan planes during the return-movement which are inclined in the other direction are drawn with a dotted line. These inclined traces result in a "wobbling" representation of the continuously scanned volume or in a "blurred" representation if smoothing filters are applied because the data during a movement in one direction are replaced by the data during the movement in the opposite direction; it is assumed the both scan movements reach the same positions of the object.

Figure 6:
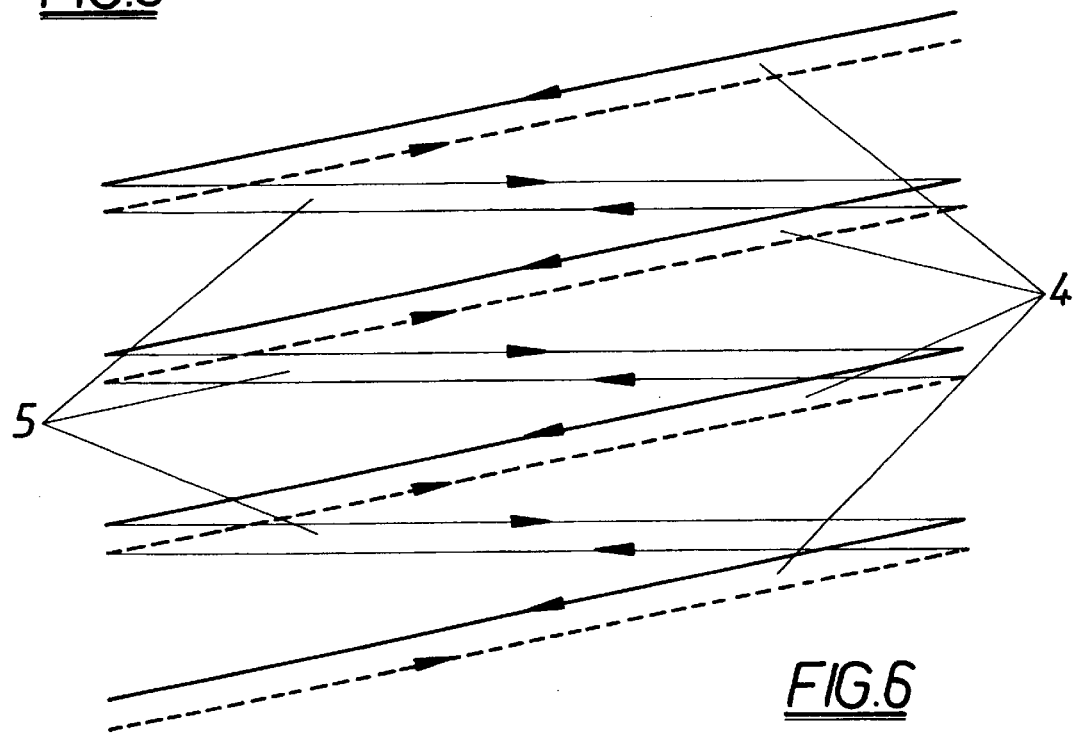
FIG. 6 traces of the scan planes if the B-Mode-scanning (M-B) is done in both directions of the 3D-scanning (M-3D) but following the present invention FIG. 7 Block-diagram of the parts of an ultrasound apparatus which are applied for the 3D acquisition/-processing according to the present invention FIG. 8 Flowchart of a possible realization of the procedure

According to the present invention the acquisition and storage of the data are controlled so that during one scan movement (M-3D) the information is collected and stored e.g. from "left" to "right", and during the scan movement (opposite direction) the data collection is reversed (from "right" to "left"). Using this method the resulting traces of the scan planes coincide as shown in FIG. 6. This results in a "non-wobbling", "non-blurred" representation of a scanned volume.

In a standard 2D ultrasound system the storage of images (CINE-mode) are done in Cartesian coordinates ("Scanconversion"). Doing so the echo data are filled into picture-elements ("Pixel") according to geometrical considerations. If pixels are not crossed by an ultrasound beam (and therefore have no primary echo information) the value for this pixel is interpolated from the surrounding pixels having a primary echo information. And if several ultrasound beams cross one pixel then only one value can be stored for this pixel. If the reconstruction of 3D data-sets is now based on such Cartesian data-sets then the original echo information is no longer available. Therefore it is part of this invention to store the complete ultrasound information of each ultrasound beam in a vector-oriented storage and to make all 3D reconstruction based on this complete data-set (e.g. Surface rendering, reconstruction of arbitrary planes, etc.). Normally all ultrasound beams forming a scan plane cross one point (apex). If this point is near to the surface of the probe then it is a "Sector-scan", are the beams parallel (point is "in infinity") then it is a "Linear-Scan" and all in between is called "Convex-Scan". Of course also combinations can be applied as e.g. a "Linear scan" in the middle of an area combined with a "Sector-scan" at the edges of the scanned area (such methods are known from patents). The volume scan is normally performed in an orthogonal direction to the B-mode scan plane and is done also either as a "Sector-", "Linear-" or "Convex"-scan; but not necessarily with the same scan-parameters (e.g. radius of swiveling etc.) as for the B-mode scan. This results in an address control of the vector-oriented storage which is based on toroidal coordinate transformations.

Below a description is made of a preferred embodiment of the present invention. The described embodiment is only one out of several solutions.

Figure 7:
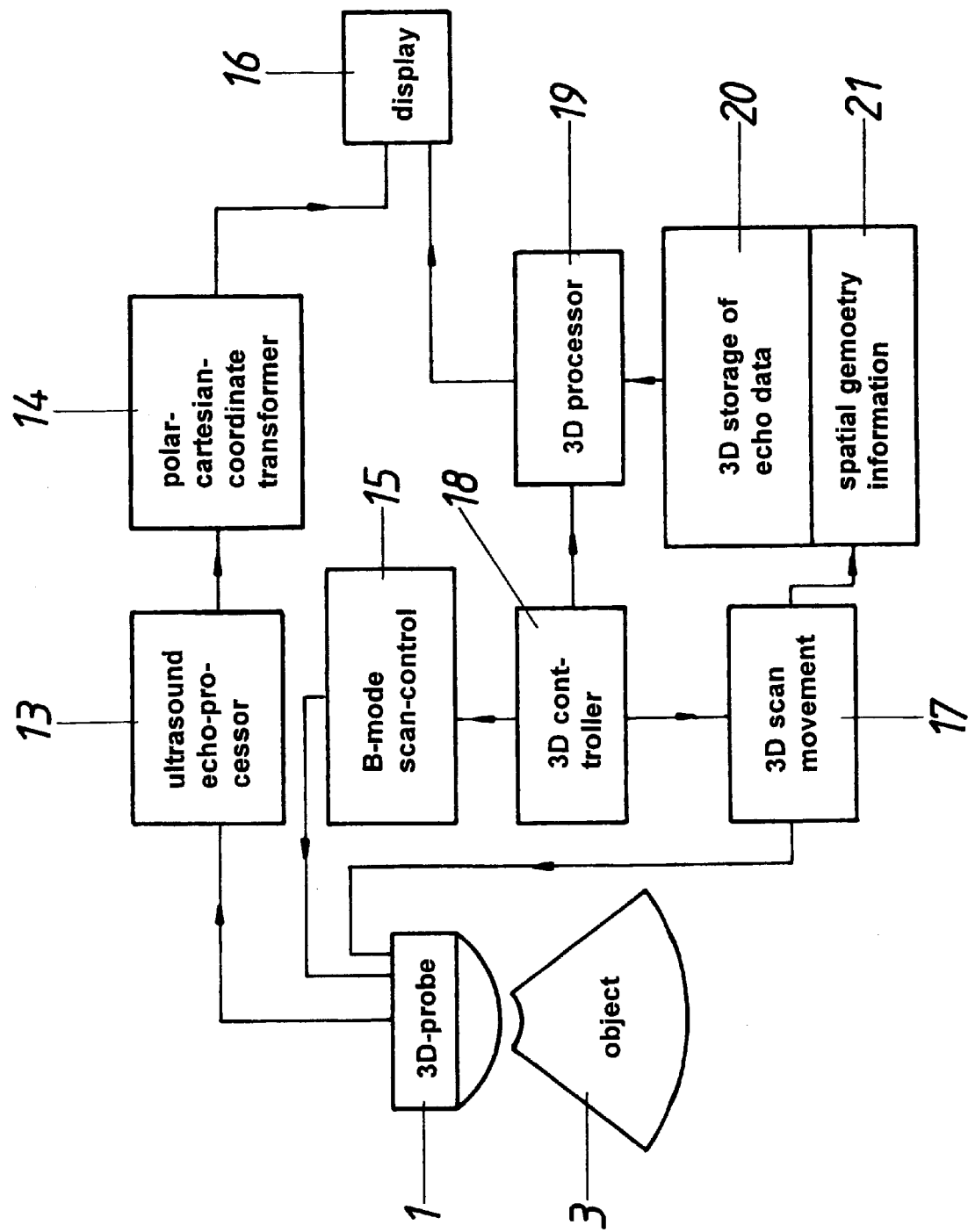

A system for the continuous volume scanning of an object by the means of ultrasound waves is shown in FIG. 7. It consists of a standard ultrasound part (ultrasound-echo-processor 13, polar-Cartesian-coordinate transformer ("Scanconverter") 14, B-mode scan-control 15 and the display 16) and the system components according to the invention (special probe 1 for volume scanning, controller for the volume scan movement 17, modified control-unit for B-mode scanning, general 3D controller 18, 3D-processor 19, 3D-storage of echo data 20 and a unit to keep all spatial geometry information's 21). For the visual representation of the 3D data sets the display unit 16 can be used. The coordination of all system components is done by the 3D system controller 18.

Figure 8:
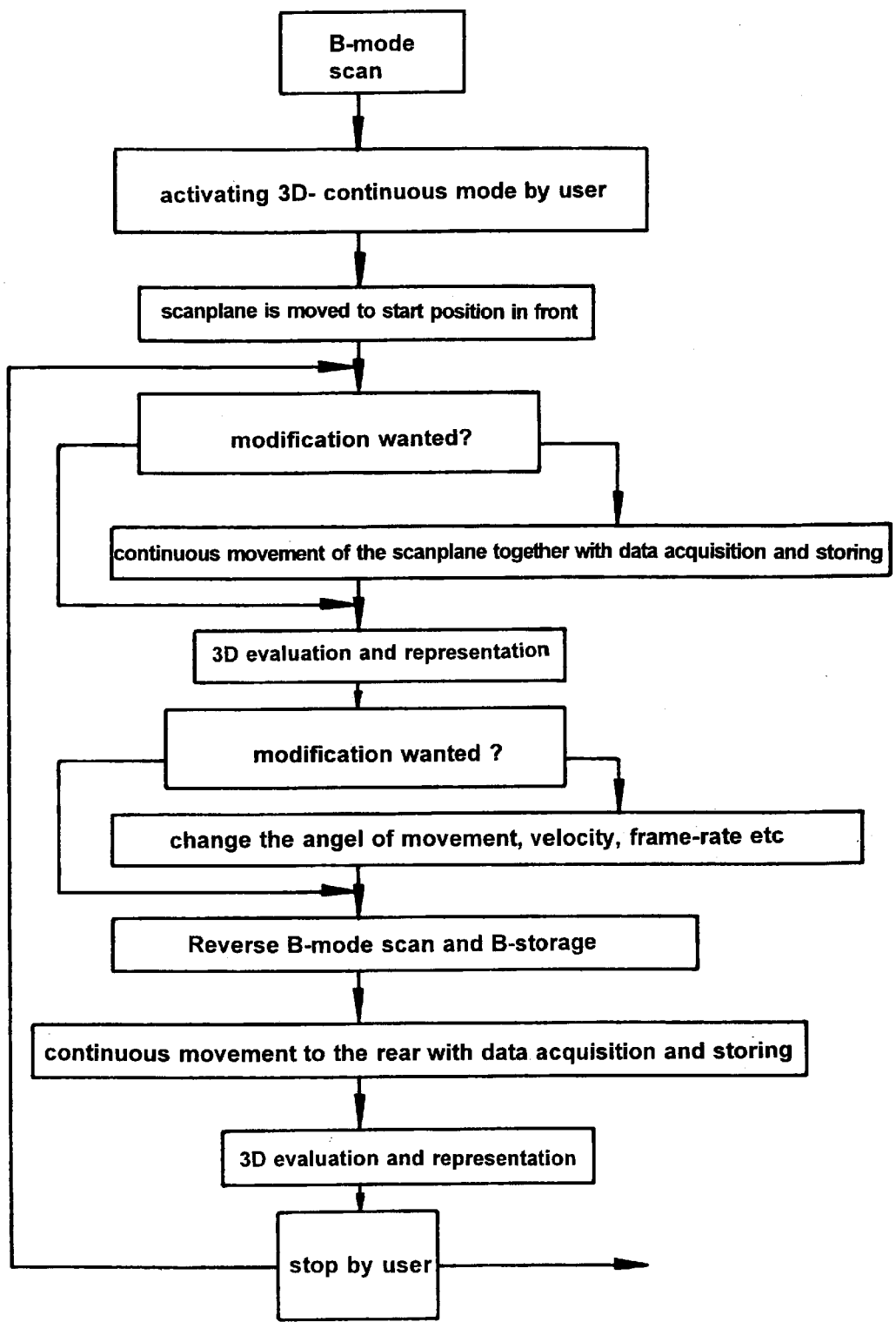

Below a possible realization is shown according to the present invention which performs a continuous volume scan (FIG. 8). The procedure starts with a standard B-mode scan of the object (state-of-the-art) for a first orientation about the position of object (e.g. the localization of the fetus in the uterus). After activating the 3D-continuous mode (by the user) the scan plane is moved to a start-position "in front" of the area to be scanned. The scanned area can be optimized to the volume-of-interest in B-mode scan—as well as in volume scan direction at any time of the procedure. The 3D data acquisition starts now with the acquisition of the first B-mode image by moving the ultrasound beam from e.g. "left" to "right" with a constant frame rate (e.g. between 10–30 frames per second or higher). The echo signal along the ultrasound beams is sampled and stored in the 3D storage 20 according to their position. If the end-position of the volume-scan-area is reached ("in the rear") (e.g. after a time interval of 0,1–2 seconds) the 3D processor starts with the processing of the acquired data. A special preferred embodiment determines a threshold level to decide which echoes are part of the processing. The processing uses several algorithms like Maximum Intensity (sensitive for hyper-echoic structures as bones), Minimum Intensity (sensitive for hypo-echoic structures as cysts, vessels) and Transparent Mode. Simultaneous to this above mentioned data representation the preferred embodiment shows simultaneously 1 to 3 (orthogonal) cuts through the object for an easier orientation during scanning. The "3D data acquisition" and the volume rendering were described above as separate procedures. In the preferred embodiment all these procedures run simultaneously. The scan plane is now moved in the opposite direction ("from the rear to the front") whereby according to the present invention the scan direction (and also the address unit of the vector-storage) is also reversed (from "right" to "left") to reach the same positions relative to the object as in the first volume scan movement (as explained in FIG. 6). If the start-position ("in front") is reached again they procedure of acquisition and representation continues as mentioned above.

This cycle continues until the user stops the continuous volume scanning.

What is claimed is:

1. A method of examining an object by means of ultrasound waves, which comprises the steps of
    (a) scanning a volume of the object by the ultrasound waves emitted from a 3D-ultrasound probe designed to produce a B-mode image during the scanning while maintaining the probe stationary,
    (b) moving a scanning plane in a transmitter/receiver unit in the stationary probe across the volume transversely to the scanning plane,
        (1) a volume-of-interest being selected by setting limits for the path of movement of the scanning plane,
    (c) at least substantially continuously scanning the volume-of-interest by echo pulses generated and processed during the movement of the scanning plane,
    (d) storing signals generated by the echo pulses in a correct position corresponding to the geometric location of the origin of the signals,
    (e) evaluating the stored signals by a 3D-processor to produce the B-mode image, and
    (f) displaying the image on a display unit.

2. The method of claim 1, wherein the transmitter/receiver unit is reciprocatingly moved in a forward and return movement across the volume, the signals during the return movement being generated at least close to the scanning traces during the forward movement.

3. The method of claim 2, wherein the series of echo pulses during the forward movement is reversed during the return movement whereby the B-mode image has the same spatial position during the return movement as during the forward movement.

4. The method of claim 1, wherein the signals are stored in a vector-oriented volume memory.

5. The method of claim 1, selectively matched to the object by a parameter selected from the group consisting of adjusting the scanning angle of the B-mode image, the swivelling angle for the volume scanning, the number of echo pulses forming the B-mode image, the sweeping speed of the canning, the maximum depth of the echo pulses, and the arbitrary plane from which the volume is illuminated.

6. The method of claim 1, comprising the further step of interpolating on the display unit between at least two sequentially produced images.

* * * * *